United States Patent [19]

de Rosa

[11] 3,925,730

[45] Dec. 9, 1975

[54] SECURE COMMUNICATION SYSTEM

[75] Inventor: Louis A. de Rosa, Upper Montclair, N.J.

[73] Assignee: International Telephone and Telegraph Corporation, Nutley, N.J.

[22] Filed: Feb. 15, 1966

[21] Appl. No.: 527,317

[52] U.S. Cl. .......... 325/32; 179/1.5 R; 343/100 CL

[51] Int. Cl.[2] .......................................... H04K 1/00

[58] Field of Search .......... 325/32, 34, 42, 65, 132, 325/473, 476; 178/5.1, 22; 343/100.7, 18 E, 100 CL; 179/1.5 R

[56] References Cited

UNITED STATES PATENTS 3,263,231 7/1966 Smith et al. ..................... 343/100.7

*Primary Examiner*—Maynard R. Wilbur
*Assistant Examiner*—H. A. Birmiel
*Attorney, Agent, or Firm*—John T. O'Halloran; Menotti J. Lombardi, Jr.

[57] ABSTRACT

A plurality of noise signals each having a predetermined time delay with respect to each other are produced from atmospheric noise or man-made noise. Each of the noise signals are coupled to different time coincident devices. The intelligence signal is quantized and the output levels therefrom are coupled to different ones of the coincident devices to select a noise signal to represent the quantized level. The selected noise signals are transmitted to a receiver in which replicas of the noise signals are generated. A plurality of correlation detectors each responsive to a given noise signal and its replica are provided in the receiver to recover the intelligence signal.

10 Claims, 6 Drawing Figures

INVENTOR.
LOUIS A. DeROSA
BY

INVENTOR.
LOUIS A. De ROSA
BY [signature]

INVENTOR.
LOUIS A. De ROSA
BY Isidore Togut

SECURE COMMUNICATION SYSTEM

This invention relates to a communication system and more particularly to a secure communication system.

It is well known in the prior art to mask a message signal with noise. Such known systems have in the past added to the message signal a random signal consisting of a random series of frequencies. At the receiver, a replica of the masking signal was provided. Such a prior art system provided a degree of secrecy, but the presence of a message signal was apparent to unauthorized persons who could perform the same decoding function as the intended recipient of the message.

A secure communication system should not alert unauthorized receiving points to the fact that a message is being transmitted. In addition, such an ideal secure system transmission should not be easily decoded if it should be received by unauthorized stations.

An object of this invention is to provide a secure communication system by increasing the difficulty of unauthorized reception of a signal message or wave being transmitted.

Another object of this invention is to provide a secure communication system which utilizes periodic or aperiodic energy occurrences deliberately or accidently produced by natural and/or human agencies and in which the characteristics of the transmitted intelligence modulated signal are undiscernable.

A feature of this invention is a communication system which comprises a source of intelligence signals and means to produce a plurality of other signals, each of the other signals differing from each other by a predetermined time interval or time delay. Different ones of these other signals are appropriately selected by a predetermined characteristic of the intelligence signals for transmission. At the receiver, there is provided means to produce replicas of the other signals and by comparing the signal replicas with the detected signals, the intelligence signal is recovered.

Another feature is that these other signals comprise a random signal delayed different amounts to provide a plurality of random signals differing from each other by a predetermined time delay. The predetermined characteristic of the intelligence signals is provided by quantizing the intelligence signals to obtain different amplitudes or quantized levels. Each of these quantized levels is then fed to a different one of a plurality of gating means together with a predetermined one of the random signals. When a time coincidence occurs between a quantized level and one of the random signals, said one of the random signals appears at the output of that particular gating means and is transmitted.

Still another feature is that the random signal can be lightning or any other energy which may be extracted from the atmosphere and utilized as the random signal.

These and other features and objects of this invention will become more apparent by reference to the following description taken in conjunction with the accompanying drawings, in which.

Figure 1:
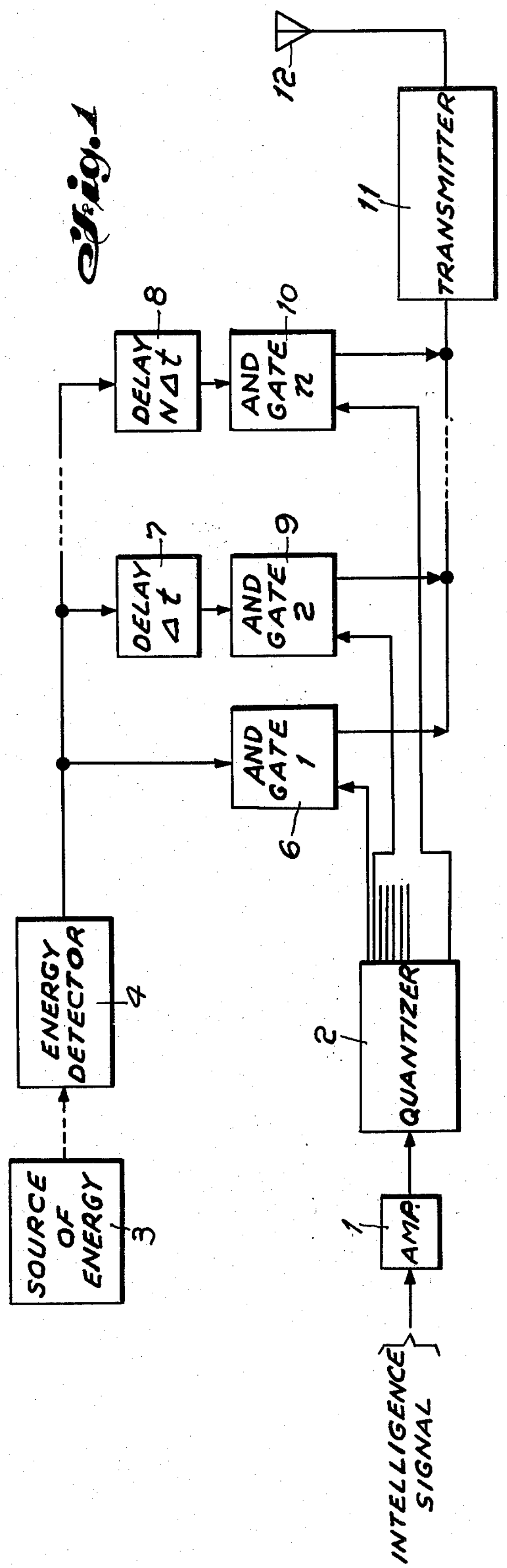
FIG. 1 is a block diagram of the transmitting station of one embodiment of this invention.
Figure 2:
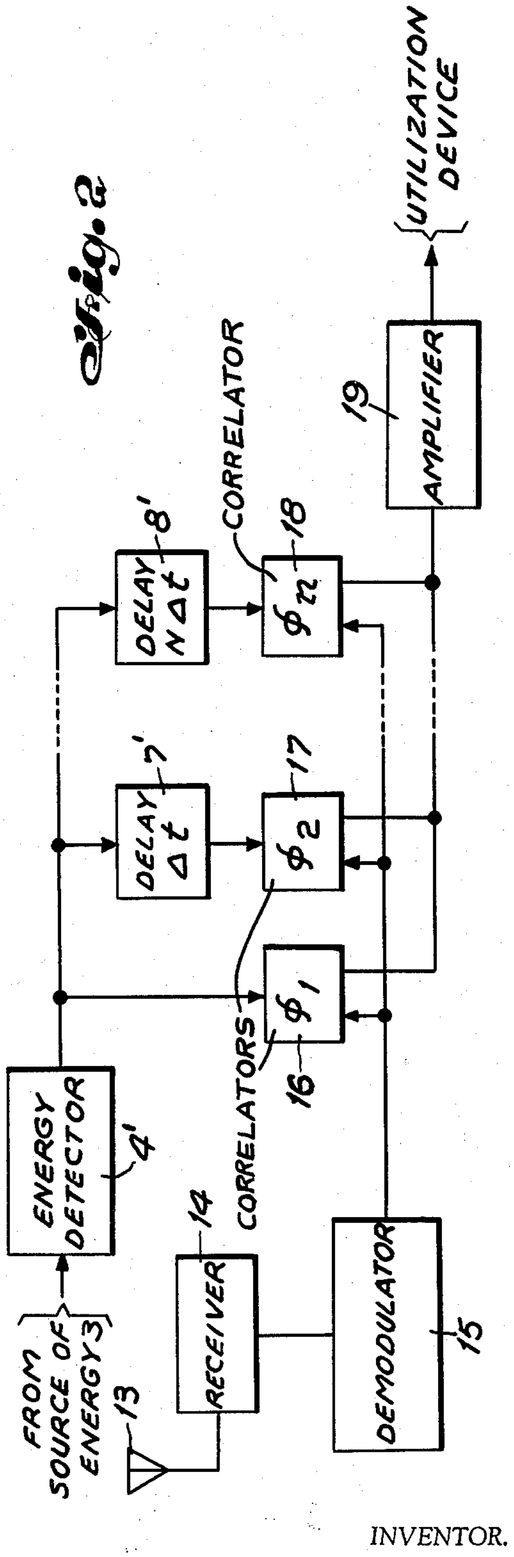
FIG. 2 is a block diagram of the receiver for the embodiment of FIG. 1.

Referring now to FIGS. 1 and 2, there is shown a source of intelligence signals which is coupled to an amplifier 1, the output of which is coupled to a quantizer 2. The quantizer 2 may be of the cathode ray tube type, or it may include a plurality of bistable threshold devices, each having a different threshold level, and an inhibitor coupled to the output of each of the threshold devices with the inhibit terminal coupled to the output of the next highest threshold device to provide an output from only the threshold device having the highest threshold level equalled or exceeded by instantaneous amplitude of the intelligence signal. The output of the quantizer may have eighteen level outputs, though 32 would be better, with a compressor circuit to limit the dynamic range. A source of energy 3 which may be either natural noise, such as lightning, or man made, such as jamming signals, is utilized to provide the noise signal. This energy is detected by the energy detector 4 at the transmitting station. The noise signal output of the energy detector is coupled directly to the first AND gate 6 to which is also coupled the lowest amplitude or level output of the quantizer 2. The noise signal output of detector 4 is also successively coupled to delay circuits 7 through 8 for a total of n-1 delay circuits so that the total of the differently time delayed noise signals including the undelayed noise signal and all the delayed noise signals are equal to the outputs of the quantizer 2. The output of delay circuit 7 having a delay of $\Delta t$ is coupled to AND gate 9 to which is also coupled the next highest level output of quantizer 2. The output of delay circuit 8, which has a delay of $N\Delta t$, is coupled to AND gate 10 to which is coupled output $n$, the highest level output, of quantizer 2. Therefore, it is seen that the lowest level output of quantizer 2 is coupled to gate 6 to which is also coupled the undelayed output of the energy detector 4. Gate 9 is associated with the output of energy detector 4 having a delay time $\Delta t$ and the nth output of the quantizer 2 is associated with the output of energy detector 4 having a delay time of $n\Delta t$. That is, when the speech or other intelligence signal is quantized, each level is represented by a different value of delay $n\Delta t$ of the quasi noise-like signal obtained from the energy detector 4. The differently timed noise signal outputs of the gates 6, 9, 10, etc., are then coupled to transmitter 11 where they modulate a carrier signal either in FM, AM or any other convenient mode and the resultant signal is then transmitted from antenna 12. At the receiver shown in FIG. 2, the transmitted noise signal is picked up by the receiving antenna 13 and fed to receiver 14. The output of the receiver 14 is then demodulated in the demodulator 15 to obtain the noise signal representing the different quantized levels. This output of the demodulator 15 is then applied in parallel to the input terminals of correlators 16, 17, 18, that is, the number of correlators is equal to the number of gates in the transmitter. Each correlator would consist of a multiplier, an integrator having an integration period inversely related to approximately the highest speech frequencies to be passed, and an arrangement to provide a different amplitude for the output of each of the correlators related to the associated quantized level at the transmitter, such as by an amplifier or attenuator. Also, at the receiver is an energy detector 4' similar to the energy detector 4 of the transmitter to detect, the noise signal of the source of energy 3 and the noise output of the energy detector is then coupled undelayed to correlator 16. The energy detector noise output is also coupled to a first delay circuit 7′, having a delay time equivalent to the delay circuit of delay 7 of the transmitter, successively to other delay circuits similar to those in the transmitter. The noise outputs of the delay circuits are then coupled to associated correlators; as shown, the noise output of delay circuit 7′ is fed to correlator 17 and the noise output of delay circuit 8′ is coupled to correlator 18. All the outputs of the correlators are then fed to amplifier 19. When the noise signal of detector 4′ is correlated with the noise signal at the output of demodulator 15 in one of the correlators 16–18, an output from that correlator is produced having an amplitude related to the quantized level represented by the received noise signal. Thus, at the output of amplifier 19 the intelligence signal is reconstituted and coupled to a utilization device. The time delay of each delay circuit 7′–8′ is identical to the time delay of each delay circuit 7–8 and must be sufficient to prevent interference between adjacent correlators, that is, only one correlator should produce an output for one noise signal. In other words, the pattern of the individual noise signals must not overlap.

Figure 3:
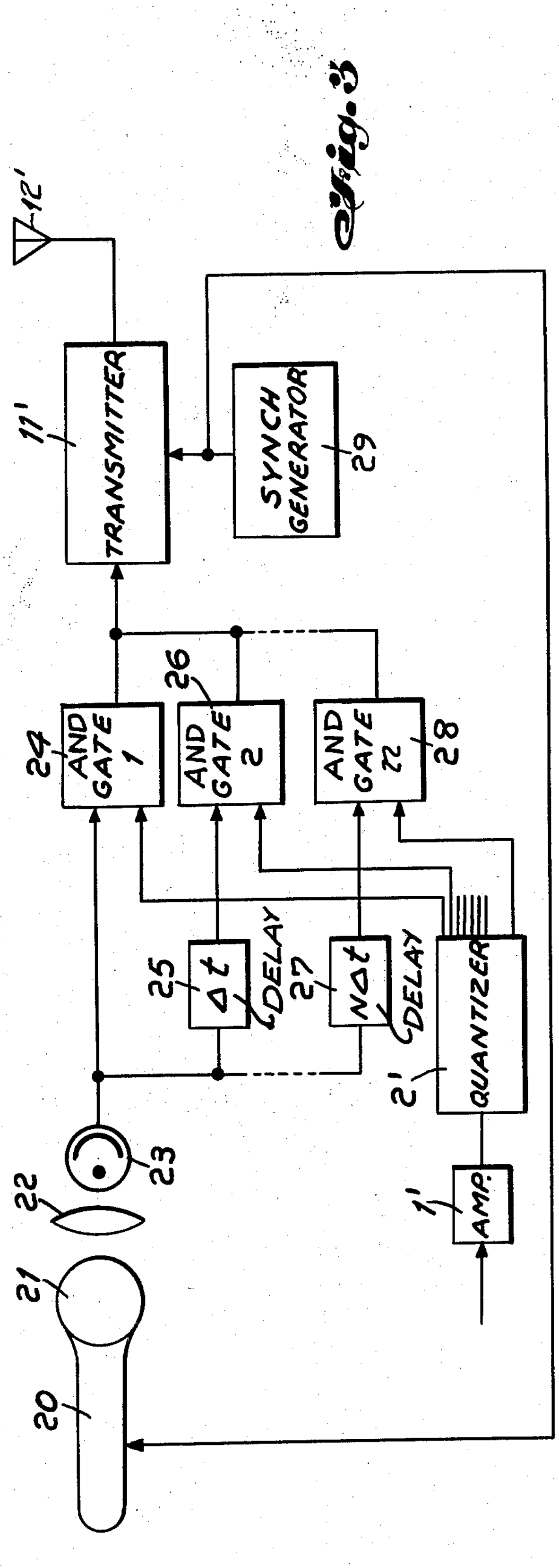
FIG. 3 is a block diagram of the transmitter of another embodiment of this invention.
Figure 4:
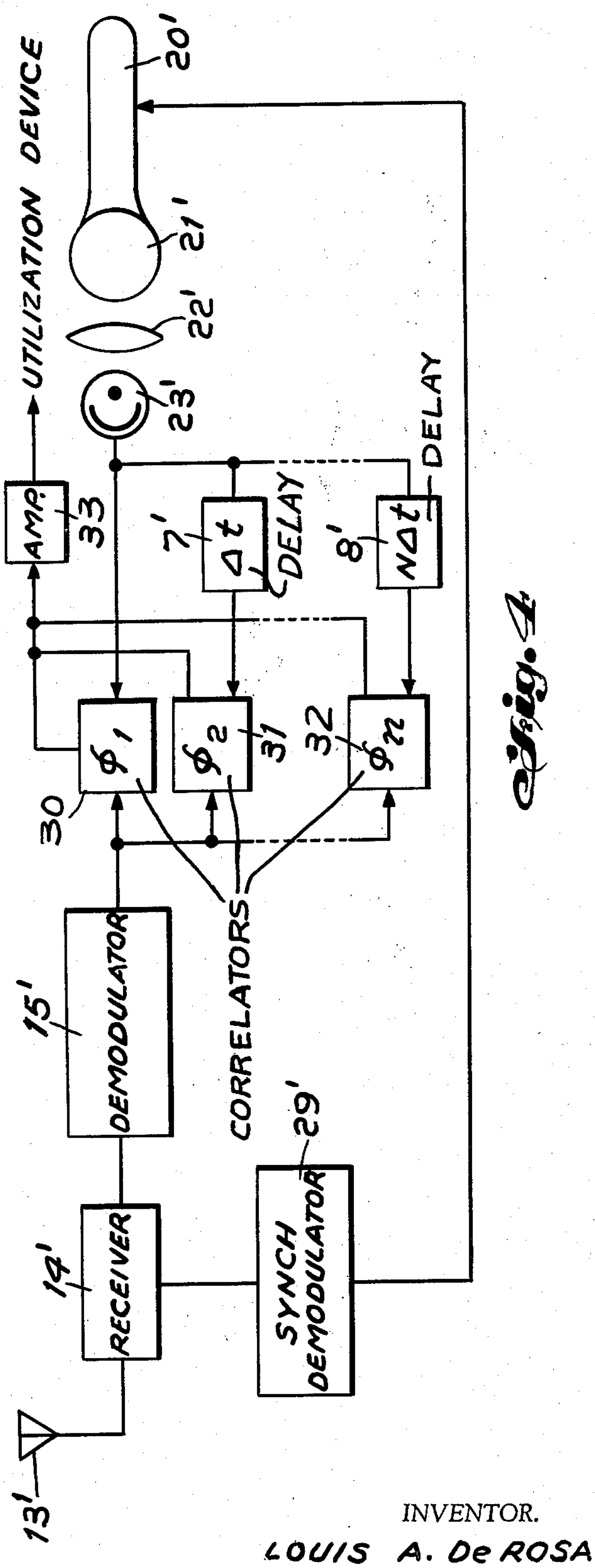
FIG. 4 is a block diagram of the receiver used with the transmitter of FIG. 3.

In the embodiment of FIGS. 3 and 4 there is shown a cathode ray tube 20 at the transmitting station and disposed over the screen of the tube is a mask 21 or target which carries on it noise signals disposed at a plurality of levels. The noise signal pattern can be continuous but in view of the horizontal sweep of the cathode ray tube, it must be disposed in horizontal levels on the face of the tube. The cathode beam of the tube 20 is then swept over the fluorescent screen to actuate or illuminate the mask 21. The noise signals on the mask 21 can be of any type similar to noise signals on the noise wheel to be described in the next embodiment; that is, the noise signals of the levels can be of a continuous pattern similar to the one that would be applied on the noise wheel. The light signal passing through the mask 21 is then collected by the lens 22 disposed in front of the tube 20. The light signals so collected are projected onto the photoelectric cell 23. The noise output of the photoelectric cell 23, is then passed undelayed to gate 24. The same noise output of photoelectric cell 23 is delayed an amount Δt by a delay circuit 25 and coupled to gate 26. The noise output of photoelectric cell 23 is passed through delay circuit 27 with a delay $n\Delta t$ and then coupled to gate 28. The number of gates, of course, would be equal to the number of quantizing levels of the quantizer 2′. The intelligence signal as before is coupled to an amplifier 1′ and the output of the amplifier 1′ is coupled to the quantizer 2′. The outputs of quantizer 2′ is similar to the quantized outputs of quantizer 2. The noise outputs of the gates 24, 26 and 28 etc., are then coupled to transmitter 11′ and transmitted from the antenna 12′. Additionally, a sync generator 29 synchronizes the sweep of the cathode ray tube 20 and the synchronization signals are also transmitted via transmitter 11′ to the receiver. In the receiver, the received signals are demodulated and then fed to correlators 30, 31, 32 having the same output characteristic as described in conjunction with correlators 16, 17 and 18 of FIG. 1. At the receiver, there is a cathode ray tube 20′ similar to the cathode ray tube 20, and disposed over the fluorescent screen of cathode ray tube 20′ is a mask 21′ identical with the mask 21 in the transmitter. The light signals passing through the mask 21′ are then collected by the lens 22′ and detected by the photoelectric cell 23′. The output of the photoelectric cell with one undelayed output and the other outputs having successively greater delays as above explained, are then coupled to the inputs of correlators 30, 31 and 32 which upon correlation of the locally generated noise signal and a received noise signal produces an output having an amplitude related to the quantized level represented by the received noise signal. The different amplitude outputs of the correlators are then fed to amplifier 33 and the reconstituted intelligence signal at the output of amplifier 33 is coupled to a utilization device. In accordance with known techniques the received synch signals are demodulated in the synch demodulator 29′ and the output thereof is fed to cathode ray tube 20′.

Figures 5, 6:
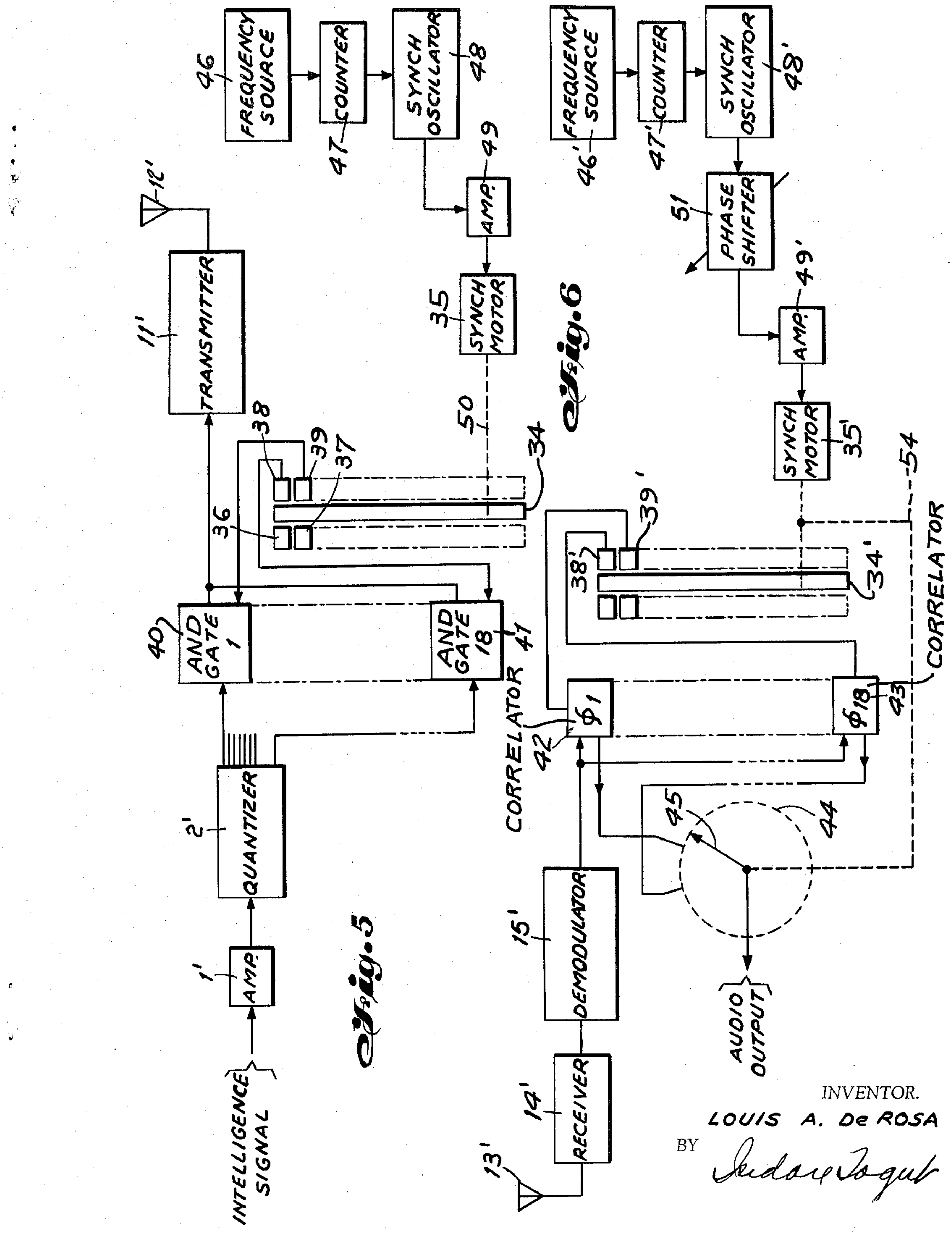
FIG. 5 is a block diagram of the transmitter of still another embodiment.
FIG. 6 is the receiver utilized with the transmitter of FIG. 5.

In the embodiment of FIG. 5, the intelligence signal is quantized in the manner above explained and the noise signal is supplied from a noise wheel 34 which is rotated by a motor 35. The noise wheel 34 is composed of a transparent or translucent material. Portions of the rim of noise wheel 34 are made opaque in such a manner that when light from sources 36 and 37 pass through the rim, photocells 38 and 39 disposed opposite the lights 36 and 37 on the other side of the wheel will detect the quantity of light which will vary as the noise wheel 34 is rotated. For an illustration, eighteen photocell pickups 38, 39, etc., are placed around the circumference of the noise wheel 34 so as to be sensitive to the light from the same number of light sources 36, 37 etc., as explained above. The eighteen photocell pickups are disposed equidistant on the periphery of the noise wheel and therefore produce the signal wave $e(t)$ delayed by 360/18 or 20° of the cycle, yielding therefore $e(t+N\Delta t)$ where N is 1, 2... to 18 and $\Delta t$ is T/18 where T is the period of the signal matrix. The leads from each photocell are connected to gates 40, 41, etc., or a total of 18 gates equivalent to the total number of photocell outputs. The quantized signals from quantized signals from quantizer 2′ are coupled respectively to gates 40, 41 and so forth, so that when there is a coincidence of signal output from quantizer 2′ and the photocell output to any gate, there is a noise output from the gate so coincidently excited which is coupled to the transmitter 11′ and transmitted as heretofore explained. At the receiver in the same manner, the signal is demodulated and coupled to correlators 42, 43 or a number of correlators equivalent to the number of signal outputs, that is, in this case, 18 correlators. At the receiver there is also shown a noise wheel 34′ similar to the noise wheel 34 of the transmitter, and light sources and photoelectric cells are disposed similarly about the rim of the noise wheel 34′ to detect the noise signal as the noise wheel is rotated by the motor 35′. The outputs of the photocells 38′, 39′, etc., are coupled to correlators 42 and 43 having different output amplitudes related to the quantized level represented by the noise signal received. Where there is coincidence or correlation of both inputs to the correlators, an output having an amplitude related to the corresponding quantized level is obtained which is coupled to the commutator ring 44. As the switch arm 45 is rotated the intelligence signal is reconstituted for utilization. The commutator switch arm 45 is synchronized in rotation to the noise wheel rotation by means of mechanical coupling 54. To provide for synchronous rotation of both transmitter and receiver noise wheels, the following arrangement is used. In order to rotate the noise wheel 34, energy at a given frequency is provided from frequency source 46 and coupled through a counter 47 which provides a check on the output of source 46 and insures that a given frequency is coupled to synchronous oscillator 48. The output of oscillator 48 is coupled by amplifier 49 to the synchronous motor 35 which drives the noise wheel 34 through the mechanical coupling 50. At the receiver, a frequency source 46' has its output coupled to a counter circuit 47' whose output is coupled to a synchronous oscillator 48' to provide a source of energy which when passed through amplifier 49' to synchronous motor 35' will cause the noise wheel 34' to rotate at the same speed as the transmitter noise wheel 34. Since the rim of noise wheel 34 is identical to the rim of noise wheel 34', the output of any photocell should be a noise signal identical to the output of the similar photocell in the same location in the transmitter. Prior to operation of the device with intelligence signals, a steady noise signal is transmitted from the transmitter to the receiver for synchronization purposes. If the noise signal from the amplifier 49' is in synchronism with the noise signal transmitted and detected in the receiver and demodulator, the output of the correlators will be a maximum. However, if the noise wheels 34 and 34' are not in synchronism, the output of the correlators will not be a maximum. Phase shifter 51 permits the rotation of noise wheel 34' to be adjusted until a maximum output from a correlator is obtained. Once this condition exists, the two noise wheels will remain in synchronism and the message may be transmitted.

While I have described above the principles of my invention in connection with specific apparatus, it is to be clearly understood that this description is made only by way of example and not as a limitation to the scope of my invention as set forth in the objects thereof and in the accompanying claims.

I claim:

1. A communication system comprising:
a source of intelligence signal;
first means to produce a plurality of other signals, each of said other signals differing from each other by a predetermined time delay and being related to a different magnitude of a predetermined characteristic of said intelligence signal;
second means coupled to said source and said first means responsive to said magnitude of said predetermined characteristic of said intelligence signal to select the appropriate ones of said other signals;
third means coupled to said second means to transmit said selected other signals;
fourth means coupled to said third means to detect said selected other signals;
fifth means to produce replicas of said other signals; and
sixth means coupled to said fourth means and said fifth means to compare said detected selected other signals and said replicas of said other signals to recover said intelligence signal.

2. A system according to claim 1, wherein
said first and fifth means each include
a source of random signals, and
seventh means coupled to said source of random signals to provide said random signals as said other signals and said replicas of said other signals.

3. A system according to claim 1, wherein
said first and fifth means each include
a source of noise, and
seventh means coupled to said source of noise to provide said noise as said other signals and said replicas of said other signals.

4. A system according to claim 1, wherein said sixth means includes
a plurality of correlation means, each responsive to a different one of said other signals and its replica.

5. A system according to claim 1, wherein
said second means includes
an amplitude quantizer coupled to said source to provide a plurality of different discrete amplitude signals, and
a plurality of coincident gates, each coupled to said quantizer and said first means responsive to a different one of said other signals and a related one of said amplitude signals to couple the associated one of said other signals to said third means upon time coincidence of the signals to which it is responsive.

6. A system according to claim 1, further comprising a source of atmospheric noise; and wherein
said first means includes
a first detector to detect said noise, and
seventh means coupled to said first detector to provide said noise as said other signals; and
said fifth means includes a second detector to detect said noise, and eighth means coupled to said second detector to provide said noise as said replicas of said other signals.

7. A system according to claim 1, wherein
said first means includes
a first source of noise having a predetermined pattern, and
seventh means coupled to said first source to provide said noise as said other signals; and
said fifth means includes
a second source of noise having a pattern identical to said predetermined pattern, and
eighth means coupled to said second source to provide said noise as said replicas of said other signals.

8. A system according to claim 1, wherein
said second means includes
an amplitude quantizer coupled to said source of intelligence signal to provide a plurality of different discrete amplitude signals, and
a plurality of coincident gates each coupled to said quantizer and responsive to a different one of said amplitude signals;
said first means includes
seventh means to detect atmospheric noise, and
eighth means coupled to said seventh means to provide said noise as said other signals each being coupled to a different one of said gates, the associated one of said noise signals being coupled to said third means upon time coincidence of said associated one of said noise signals and the related ones of said amplitude signals;
said fifth means includes
ninth means to detect said atmospheric noise, and
tenth means coupled to said ninth means to provide said noise as said replicas of said other signals; and
said sixth means includes
a plurality of correlator means each being coupled to said fifth means and a different one of said replicas of said noise signals.

9. A system according to claim 1, wherein said second means includes an amplitude quantizer coupled to said source of intelligence signal to provide a plurality of different discrete amplitude signals, and a plurality of coincident gates each coupled to said quantizer and responsive to a different one of said amplitude signals;

said first means includes a first cathode ray tube having a fluorescent screen and an electron beam scanning said screen, a first light transmitting member disposed adjacent said screen to receive light therefrom, said first member having a plurality of contiguous regions each having different degrees of light transmissibility to provide a given pattern, a first photoelectric cell disposed adjacent said first member responsive to the varying light transmissibility of said first member to produce a first electrical signal proportional thereto, and seventh means coupled to said first cell to provide said first electrical signal as said other signals each being coupled to a different one of said gates, the associated one of said first electrical signals being coupled to said third means upon time coincidence of said associated one of said first electrical signals and the related one of said amplitude signals;

said fifth means includes a second cathode ray tube having a fluorescent screen and an electron beam scanning said screen in synchronism with the electron beam of said first tube, a second light transmitting member disposed adjacent the screen of said second tube having a characteristic identical to the characteristic of said first member;

a second photoelectric cell disposed adjacent said second member responsive to the varying light transmissibility of said second member to produce a second electrical signal proportional thereto and identical to said first electrical signal; and eighth means coupled to said second cell to provide said second electrical signal as said replicas of said other signals; and said sixth means includes a plurality of correlator means each being coupled to said fifth means and a different one of said replicas of said second electrical signals.

10. A system according to claim 1, wherein said second means includes an amplitude quantizer coupled to said source of intelligence signal to provide a plurality of different discrete amplitude signals, and a plurality of coincident gates each coupled to said quantizer and responsive to a different one of said amplitude signals;

said first means includes a first noise wheel, seventh means to rotate said first wheel, a first plurality of light sources disposed in spaced relation about the periphery of said first wheel for light transmission therethrough, a first plurality of photoelectric cells each associated with a different one of said first light sources to receive the light transmitted through said first wheel, and eighth means to couple the output of each of said first cells to a different one of said gates where time coincidence of the signals coupled to each of said gates presents the output of the associated one of said first cells to said third means;

said fifth means includes a second noise wheel, ninth means to rotate said second wheel in synchronism with said first wheel, a second plurality of light sources disposed in a spaced relation about the periphery of said second wheel for light transmission therethrough with the positioning of said second light sources relative to said second wheel being identical with the positioning of said first light sources relative to said first wheel, and a second plurality of photoelectric cells each associated with a different one of said second light sources to receive the light transmitted through said second wheel; and said sixth means includes a plurality of correlations means each being coupled to said fifth means and a different one of said second cells.

* * * * *